United States Patent [19]

Kenner et al.

[11] Patent Number: 5,903,749
[45] Date of Patent: May 11, 1999

[54] METHOD AND APPARATUS FOR IMPLEMENTING CHECK INSTRUCTIONS THAT ALLOW FOR THE REUSE OF MEMORY CONFLICT INFORMATION IF NO MEMORY CONFLICT OCCURS

[75] Inventors: H. Roland Kenner, Cupertino; Alan Karp, Palo Alto; William Chen, Sunnyvale, all of Calif.

[73] Assignee: Institute for the Development of Emerging Architecture, L.L.C., Cupertino, Calif.

[21] Appl. No.: 08/675,170

[22] Filed: Jul. 2, 1996

[51] Int. Cl.$^6$ .................................................. G06F 13/00
[52] U.S. Cl. ............................................ 395/567; 711/567
[58] Field of Search ................................. 711/163, 168, 711/167, 210, 157; 395/567

[56] References Cited

U.S. PATENT DOCUMENTS

| | | | |
|---|---|---|---|
| 4,488,256 | 12/1984 | Zolnowsky et al. | 711/210 |
| 5,125,083 | 6/1992 | Fite et al. | 395/383 |
| 5,226,125 | 7/1993 | Balmer et al. | 395/325 |
| 5,317,744 | 5/1994 | Harwell et al. | 395/653 |
| 5,339,442 | 8/1994 | Lippincott | 395/732 |
| 5,420,990 | 5/1995 | McKeen et al. | 395/375 |
| 5,502,728 | 3/1996 | Smith, III | 395/182.03 |
| 5,504,900 | 4/1996 | Raz | 395/650 |
| 5,515,523 | 5/1996 | Kalkunte et al. | 711/149 |
| 5,596,740 | 1/1997 | Quattromani et al. | 711/157 |
| 5,606,670 | 2/1997 | Abramson et al. | 395/250 |
| 5,659,711 | 8/1997 | Sugita | 395/476 |
| 5,694,577 | 12/1997 | Kiyohara et al. | 711/167 |

FOREIGN PATENT DOCUMENTS

| | | |
|---|---|---|
| 2265481 | 9/1993 | United Kingdom. |
| 2270781 | 3/1994 | United Kingdom. |

OTHER PUBLICATIONS

Run-time disambiguation: Coping with statically unpredictable dependencies by Nicolau, IEEE publication, pp. 663–678, 1989.

Comparison of Full and Partial Predicated Execution Support for ILP Processors, by Scott Mahlke, et al. 1995. pp. 138–149.

An Integrated Memory Management Scheme For Dynamic Alias Resolytion, by Tzi–cker Chiueh, 1991. pp. 682–691.

Three Architectural Models for Compiler–Controlled Speculative Execution, by Pohua P. Chang, et al. Apr., 1995. pp. 481–494.

(List continued on next page.)

Primary Examiner—Zarni Maung
Attorney, Agent, or Firm—Blakely, Sokoloff, Taylor and Zafman LLP

[57] ABSTRACT

A method and apparatus for implementing check instructions that allow for the reuse of memory conflict information if no memory conflict occurs. According to one aspect of the invention, a machine-readable medium having stored thereon data representing sequences of instructions is described. When executed by a computer system, the sequences of instructions cause the computer system to perform a series of steps. One of these steps involves preloading one of a set of registers data retrieved from a memory starting at a first address. Another of these steps involves storing memory conflict information representing the first address. This memory conflict information is later used for determining if a memory conflict has occurred. Another of these steps involves storing data at a second address in the memory. Yet another of these steps involves determining if a memory conflict has occurred between the first address and the second address using the previously stored memory conflict information. If a memory conflict occurred between the first and second addresses, then one of the registers is reloaded with the data located at the first address. However, if a memory conflict did not occur between the first and second addresses, then the memory conflict information is left for use during subsequent memory conflict checks. According to one embodiment of the invention, the data is reloaded into a register by causing the computer system to branch to recovery code. According to another embodiment of the invention, the data is reloaded into a register without performing any branch instructions.

37 Claims, 6 Drawing Sheets

OTHER PUBLICATIONS

The Importance of Prepass Code Scheduling for Superscalar and Superpipelined Processors, by Pohua P. Chang, et al. Mar., 1995. pp. 353–370.

Speculative Execution Exception Recovery Using Writeback Suppression, by Roger A. Bringmann, 1994. pp. 214–223.

Superblock Formation Using Static Program Analysis, by Richard E. Hank, et al. 1993. pp. 247–255.

Dynamic Memory Disambiguation Using the Memory Conflict Buffer, by David M. Gallagher, et al. 1994. pp. 183–193.

Data Preload for Superscaler and VLIW Processors, by William Yu-Wei Chen, Jr. 1993. pp. iii–118.

METHOD AND APPARATUS FOR IMPLEMENTING CHECK INSTRUCTIONS THAT ALLOW FOR THE REUSE OF MEMORY CONFLICT INFORMATION IF NO MEMORY CONFLICT OCCURS

BACKGROUND OF THE INVENTION

Field of the Invention

The present invention relates to the field of computer systems, and more specifically, to a method and apparatus for determining if memory conflicts have occurred.

Background Information

Computer programs are typically written in source code (human readable program statements written in a high-level or assembly language). This source code is then compiled into object code (machine readable code) for execution by one or more processors in the computer system. On certain processors (e.g., superscalar processors, very long instruction word processors, etc.), allowing the compiler to reorder the object code instructions can improve performance by exposing simultaneously executable instructions. However, these compilers must be able to freely reorder the instructions to be effective. Unfortunately, code reordering is often limited by what are referred to as ambiguous memory dependencies. An ambiguous memory dependency is the situation where the relationship between a pair of memory references cannot be determined accurately at compile time (the memory references cannot be "disambiguated" at compile time). An example of such an ambiguous memory dependency is shown below in Table 1A.

TABLE 1A

| Assembly Code | | Reordered Assembly Code | |
|---|---|---|---|
| | | Preload | R3 <- \|R4\| |
| | | | R3 = R3+1 |
| . | . | . | . |
| . | . | . | . |
| Store | R1 -> [R2] | Store | R1 -> [R2] |
| . | . | . | . |
| . | . | . | . |
| Load | R3 <- \|R4\| | Check | R3, Correction |
| | R3 = R3+1 | Back: | |
| | | Correction: | |
| | | Load | R3 <- \|R4\| |
| | | | R3 = R3+1 |
| | | Jmp | Back |

Table 1A shows assembly code on the left side and reordered assembly code on the right side. For the current explanation, the assembly code on the left hand side is of interest. This assembly code includes a store instruction which causes the contents of register R1 to be written to a memory address derived from the contents of register R2. Since the contents of register R2 are not known at compile time, the address to which the contents of register R1 are to be written is ambiguous. Following the store instruction is a load instruction. The load instruction causes data stored at a memory address derived from the contents of register R4 to be written into register R3. Again, since the contents of register R4 are not known at compile time, the address from which the data is to be loaded is ambiguous. Since the store instruction may be writing to the same address as the load instruction, there is said to be an ambiguous memory dependency between these load and store instructions (also termed as an ambiguous load/store pair). As a result of this ambiguous memory dependency, some compilers are unable to safely reorder the load instruction above the store instruction. Since memory dependencies often occur on program-critical paths, this limitation on reordering opportunities can severely impair the effectiveness of code scheduling.

Techniques for solving the problem of ambiguous memory dependencies include static dependence analysis and dynamic memory disambiguation. Static dependence analysis attempts to determine, at compile time, the relationship between pairs of memory references. In many cases, this analysis is able to determine that the reference pairs are either definitely dependent or definitely independent, enabling the compiler to perform optimizations of code reordering. However, static analysis is limited when: 1) memory dependencies are truly ambiguous at compile time; or 2) the reference pairs are sometimes dependent during execution, e.g., only for some loop iterations.

Dynamic memory disambiguation resolves memory dependencies during program execution. One technique for performing dynamic memory disambiguation is described in Gallagher, David; et al. "Dynamic Memory Disambiguation Using the Memory Conflict Buffer," Sixth International Conference on Architectural Support for Programming Languages and Operating Systems, ASPLOS VI Proceedings; ACM Press (1994) (referred to herein as the Gallagher reference). The memory conflict buffer scheme taught in this reference introduces two new instructions: 1) a preload instruction that performs a normal load operation, but signals the hardware that a possible dependence violation exists for this load; and 2) a check instruction that directs the hardware to determine if a violation has occurred and to branch to recovery code (also termed as "conflict correction code") if required.

In order to detect memory conflicts, the memory conflict buffer of Gallagher maintains memory conflict information for each preload instruction as it is executed. The addresses of subsequent store instructions (or some derivation of these addresses—e.g., hashed addresses) are then compared to entries in the memory conflict buffer to determine whether a conflict has occurred. The occurrence of a conflict is recorded by altering the corresponding memory conflict entry in the memory conflict buffer. When the corresponding check instruction is encountered, the hardware performs a conditional branch to correction code if a conflict has been recorded. This correction code re-executes the necessary instructions and then returns to normal program execution.

The reordered assembly code side of Table 1A illustrates the memory conflict buffer approach to reordering the code. As shown in the reordered assembly code side of Table 1A, both the load and its dependent add have bypassed (been moved above) the ambiguous store instruction. Note that the load is now a preload instruction. In addition, a check instruction has been inserted at the original location of the load. If the hardware determines that an address conflict has occurred (that the memory access required for the store instruction is the same as, or overlaps with, the memory access required by the load instruction), the check instruction will branch to correction code, which re-executes the load and any dependent instructions. In Table 1A, the check instruction causes the processor to branch to the label "Correction" where the load and the dependent add are re-executed. Upon completion of this recovery code, the processor branches back to the instruction following the check instruction.

Table 1B contains assembly code and reordered assembly code examples of ambiguous memory dependencies that are more general than those shown in Table 1A. In Table 1B, it is clear that the register containing the data that is to be stored in memory in response to executing the store instruction is not relevant (no register identifier is even shown). In addition, the register to which the data will be written in response to executing the load instruction is irrelevant. However, what is relevant is that both the load and store instructions are accessing memory locations that are ambiguous at compile time.

TABLE 1B

| Assembly Code | | Reordered Assembly Code | |
|---|---|---|---|
| | | Preload | <–[unknown address 2] |
| . | | . | |
| . | | . | |
| . | | . | |
| Store | –>[unknown address 1] | Store | –>[unknown address 1] |
| . | | . | |
| . | | . | |
| Load | <–[unknown address 2] | Check Back: | register#, Correction |
| | | Correction: | |
| | | Load | <–[unknown address 2] |
| | | . | |
| | | . | |
| | | Jmp Back | |

The memory conflict buffer hardware of Gallagher contains two basic structures, the preload array and the conflict vector. Each entry in the preload array contains the following information: 1) the register number to which the preload will write the data; 2) an address signature containing a hashed version of the untranslated memory address; 3) the preload address width; and 4) a valid bit indicating whether the entry currently contains valid data. The conflict vector has the same number of storage areas as there are physical registers, with one storage area corresponding to each physical register. Each entry in the conflict vector contains two fields: 1) the conflict bit which is used to record whether a conflict has occurred for a preload to this register; and 2) a preload pointer that indicates which storage area in the preload array currently holds the preload array entry associated with this register. The preload pointer is used for invalidating the corresponding entry in the preload array upon execution of a corresponding check instruction.

When a preload instruction is executed, an entry is created in the preload array. The valid bit of this entry is set to indicate the entry now contains valid data. Simultaneously with generating the entry in the preload array, the entry in the conflict vector corresponding to the register being preloaded is updated by resetting the conflict bit and establishing the pointer back to the entry in the preload array.

When the store instruction is executed, the store address is hashed in an identical manner as the preload address. The preload array is then searched using the hashed store address and the store access width to determine if there is a memory conflict between the store memory access and a preload memory access. If a memory conflict is detected, the corresponding conflict bit in the conflict vector is set to indicate as such. Otherwise, the store instruction executes without alteration to the preload array or conflict vectors.

Figure 1:
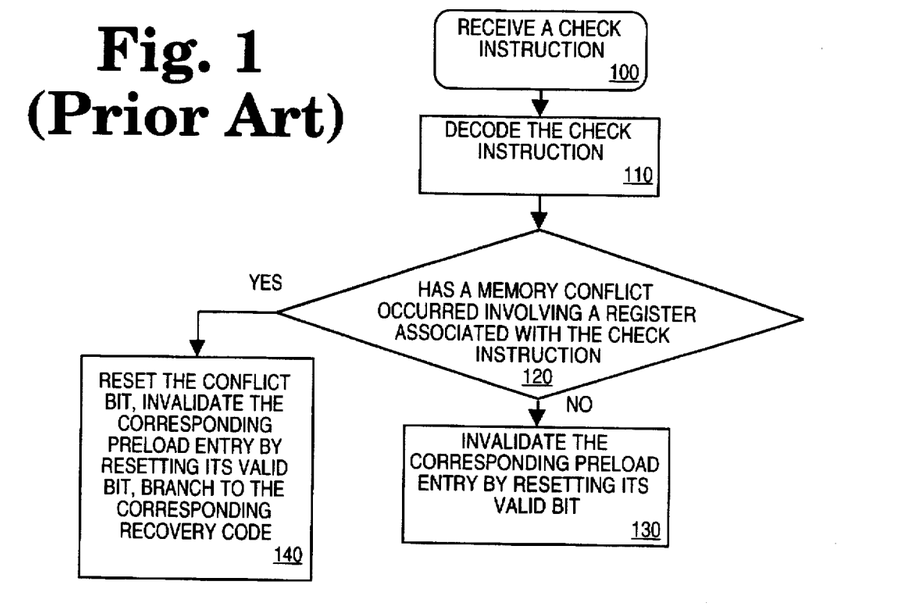
FIG. 1 is a flow diagram illustrating a method of performing a prior art check instruction.

FIG. 1 is a flow diagram illustrating a method of performing the check instruction as taught by Gallagher. The flow diagram starts at step 100, where a check instruction is received. From step 100, flow passes to step 110.

As shown in step 110, the check instruction is decoded and flow passes to step 120. As is well known in the art, instructions received by a processor are decoded into control signals and/or microcode entry points. In response to these signals and/or microcode entry points, the processor performs the appropriate operations required for execution of the instruction. The format of the check instruction is: check R#, label—where R# is a general purpose register number, and label specifies the starting address of the correction code supplied by the compiler.

At step 120, it is determined whether a memory conflict occurred involving a register associated with the check instruction. This step is performed by examining the conflict bit in the conflict vector corresponding to register R#. If the conflict bit of this entry is set, then a memory conflict occurred and flow passes to step 140. Otherwise, flow passes to step 130.

As shown in step 130, the preload array entry is invalidated by resetting its valid bit. The appropriate preload entry is determined using the preload pointer stored in the conflict vector. With reference to the example in Table 1A, the pointer stored in the entry of the conflict vector corresponding to register R3 is accessed to determine the corresponding entry in the preload array. The valid bit of this corresponding entry in the preload array is then reset.

In step 140, the conflict bit corresponding to the register R# is reset, the preload entry is invalidated by resetting its valid bit, and a branch to the corresponding recovery code is performed. The branch to the corresponding recovery code is performed by branching to the instructions stored starting at label. Thus, as shown in Table 1A, if a memory conflict occurs with reference to register R3, then a branch would be performed to the correction code at label "Correction". A branch instruction at the end of the correction code brings the execution back to the instruction immediately after the check instruction, and normal execution resumes from this point.

Thus, regardless of whether a memory conflict is detected, execution of the check instruction resets the valid bit of the corresponding entry in the preload array. Two things happen as a result of resetting this valid bit: 1) the storage area in the preload array containing the entry is now available for use by another preload instruction; and 2) store instructions to addresses which, when hashed, match the entry in the preload array will not result in the corresponding conflict bit in the conflict vector being set. In other words, the entry in the preload array is now invalid and will not be used in any subsequent memory conflict determinations.

In order to utilize the memory conflict buffer hardware of Gallagher, the compiler must be able to reorder ambiguous store/load pairs, insert check instructions, and generate correction code. It is also advantageous if the compiler is capable of taking into account the side affects of aggressive code reordering. As an example, the use of too many preload instructions can significantly increase register pressure and could result in a performance loss due to spilling. While many different scheduling algorithms can be used, a description of the scheduling algorithm described in the Gallagher reference is provided here. According to this algorithm, the compiler must look beyond the basic block boundaries to expose sufficient instruction-level parallelism to allow effective code scheduling. Thus, the compiler coalesces the basic blocks to form superblocks which reflect the most frequently executed paths through the code. Superblocks have a single entrance, but may have multiple side exits.

As stated by the Gallagher reference, the steps of the basic memory conflict buffer algorithm for each frequently executed superblock are:

1. Build the dependence graph.
2. Add a check instruction immediately following each load instruction, inserting necessary dependencies.
3. For each load, remove store/load memory dependencies.
4. Schedule the superblock, removing any unnecessary check instructions.
5. Insert required correction code.

The building of the dependence graph remains unchanged in the memory conflict buffer algorithm. Upon completion of the dependence graph, a check instruction is inserted after each load instruction in the superblock. The destination register of the load is the source operand of the check instruction, making the check instruction dependent upon the load instruction. During code scheduling, the check instruction must maintain correct dependencies; thus, it must be dependent upon the load and also inherit some of the load's dependencies. However, the check only inherits memory and control dependencies from the load because the flow-dependent instructions of the load must be able to bypass the check instruction. In addition, dependencies to the previous and subsequent branch instructions are also added to the check instruction to ensure it remains within the load's original basic block. Furthermore, dependencies are formed between the load instruction and any subroutine call in the superblock to prevent loads from bypassing subroutine calls.

Removal of store/load dependencies is the next step in this memory conflict buffer scheduling algorithm. For each load, the algorithm searches upward, dependence arcs to store instructions not determined to have a definite dependency are removed. For each load, the algorithm records a list of those store instructions whose dependence has been removed. Following this step, the superblock is scheduled. When a load instruction is scheduled, its associated list of stores whose dependence has been removed is examined. If the store instructions on that list have already been scheduled, no store instructions have been bypassed during scheduling and the associated check instruction is deleted. However, if a load instruction has bypassed a store instruction, the load is converted into a preload.

Finally, the recovery code for each preload instruction is inserted. The corresponding recovery code consists of a load instruction and all dependent instructions up to the point of the check instruction. A load instruction is used rather than a preload instruction because a check has already occurred. However, any dependent instructions that are preloads must be re-executed as preloads.

It is worthwhile to note that prior to the scheduling stage of compilation, the source code instructions in each loop are placed in a separate superblock (one loop per superblock), while source code instructions outside loops are placed in other superblocks. According to the scheduling algorithm of Gallagher, source code instructions within a superblock can be reordered inside that superblock, but cannot be moved outside of that superblock. Since source code instructions within a superblock cannot be moved outside of that superblock, source code instructions within a superblock that contains a loop cannot be moved outside of the loop.

A limitation of Gallagher's scheme results when compiling loops which contain load and store instructions having ambiguous memory dependencies. Table 2 illustrates an example of just such a loop. Table 2 shows assembly code, as well as the corresponding reordered assembly code that could be generated. As shown by this code, there is a loop which includes the same store and load instructions contained in Table 1. In this example, the address |R4| required by the load instruction is not "loop-invariant." An address is not loop-invariant if it is unknown whether that address will change during the iterations of the loop. This assembly code is typically reordered as shown on the reordered assembly code side of Table 2. As can be seen from this reordered assembly code, the preload instruction is kept within the loop. As a result, each iteration through the loop requires an entry to be created in the preload array in response to executing the preload instruction, as well as the invalidation of that entry in response to executing the check instruction. It is not uncommon for the address |R4| to remain the same for large numbers of iterations of the loop. In such situations, the repetitive execution of the preload instruction, as well as the repetitive creation and invalidation of entries in the preload array, is inefficient. In particular, this repetition is inefficient in the common situation that occurs when the address from which data is being loaded (e.g., R4) is invariant across all iterations of the loop.

TABLE 2

| Assembly Code | Reordered Assembly Code | | |
|---|---|---|---|
| ——> | ——> | | |
|  |  | Preload | R3 <— |R4| |
|  |  |  |  |
|  | Store R1 —> [R2] | Store | R1 —> [R2] |
|  | Load R3 <— |R4| | Check | R3, |
|  |  | Back: | Correction |
| —LOOP |  |  |  |
|  | —LOOP |  |  |
|  |  | Correction: |  |
|  |  | Load | R3 <— |R4| |
|  |  |  |  |
|  |  | Jmp Back |  |

Figure 2:
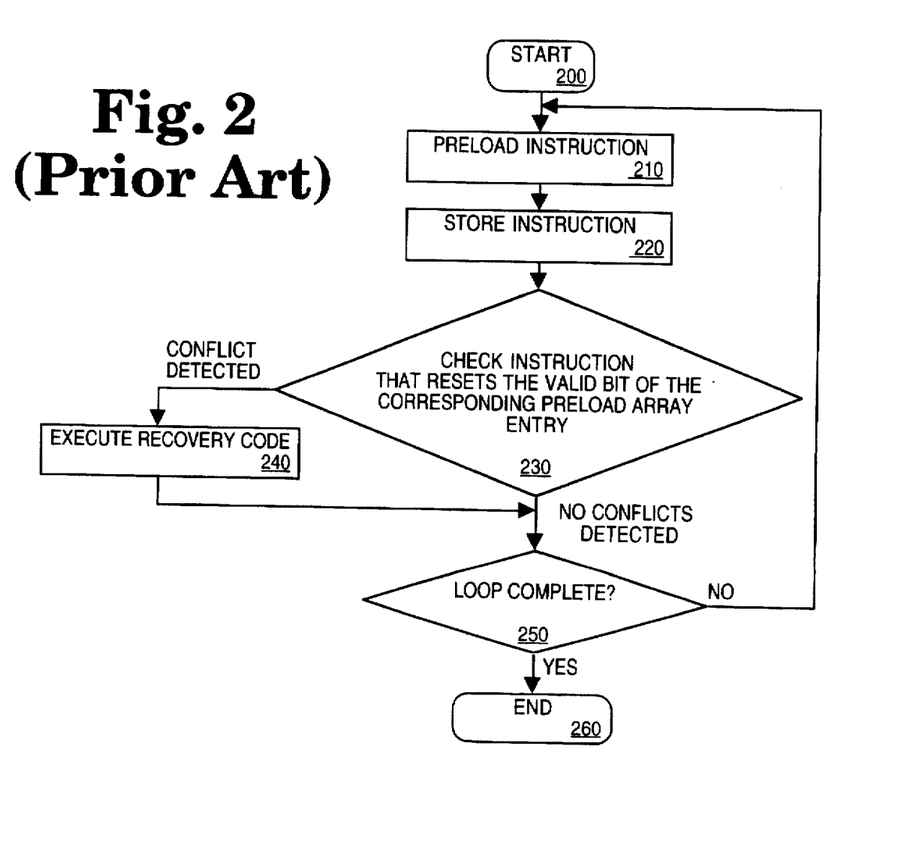
FIG. 2 is a flow diagram illustrating the execution of reordered assembly code containing a preload, store, and check instruction within a loop according to the prior art.

FIG. 2 is a flow diagram illustrating the execution of reordered assembly code containing a preload, store, and check instruction within a loop. The flow diagram starts at step 200, from which flow passes to step 210. In step 210, a preload instruction is executed. In relation to the memory conflict buffer scheme of Gallagher previously described, this memory conflict information (also termed as memory conflict entry) would include an entry in the preload array and the corresponding entry in the conflict vector. From step 210, flow passes to step 220.

In step 220, at least one store instruction is executed. In relation to the memory conflict buffer scheme of Gallagher, during execution of each store instruction it is determined if a potential memory conflict has occurred between the store instruction and the preceding preload instruction by polling the entries in the preload array. If such a memory conflict has occurred, execution of the store instruction results in the alteration of the appropriate conflict bit in the conflict vector to indicate a conflict has occurred. From step 220, flow passes to step 230.

In step 230, a check instruction is executed that results in the valid bit of the corresponding preload array entry being reset. With reference to the memory conflict buffer scheme of Gallagher, the conflict bit of the entry in the conflict vector that corresponds to the register identified by the check instruction is polled. If a conflict was detected, a branch is performed to the required recovery code (step 240). Otherwise, flow passes to step 250. Regardless of whether a conflict was detected, the check instruction resets the valid bit of the memory conflict information. As a result, this memory conflict information in the preload array is no longer used for making memory conflict determinations.

At step 240, the required recovery code is executed and flow passes to step 250. The recovery code terminates in a branch to the instruction following the check instruction of step 230. In step 250, it is determined if the loop is complete. If the loop is complete, flow passes to step 260 where the flow diagram ends. Otherwise, flow passes back to step 210 where the preload instruction is executed and another entry in the preload array is created. If the memory address of this preload instruction is the same as the previous preload instruction and there was no memory conflict, the same data is reloaded and the same preload entry is recreated. This preload entry is then later invalidated in step 230, regardless of whether a conflict occurred.

Table 3 illustrates source code written in the high-level C programming language that results in a loop containing a potentially not loop-invariant memory address that causes an ambiguous memory dependency. Table 3 is divided into two column, one column includes a specific C source code example, while the other side contains a generalized C source code example.

TABLE 3

| Specific C Source Code | Generalized C Source Code |
| --- | --- |
| While (p) {<br>  p->i = *q;<br>  p = p->next;<br>} | While () {<br>  *p = undisambiguated store<br>  = x<br>} |

Another limitation of Gallagher's scheme is that when a conflict is detected, the processor must always branch to the recovery code and back again. To illustrate this limitation, assume that there are no instructions that are dependent on a moved load instruction. Although the recovery code for this moved load instruction will only contain an instruction to reload the data, execution of this recovery code requires two branches. Since the execution of branches is expensive, the solution of Gallagher is inefficient when, for example, the recovery code includes a single instruction.

SUMMARY

A method and apparatus for implementing check instructions that allow for the reuse of memory conflict information if no memory conflict occurs is described. According to one aspect of the invention, a machine-readable medium having stored thereon data representing sequences of instructions is described. When executed by a computer system, the sequences of instructions cause the computer system to perform a series of steps. One of these steps involves preloading one of a set of registers data retrieved from a memory starting at a first address. Another of these steps involves storing memory conflict information representing the first address. This memory conflict information is later used for determining if a memory conflict has occurred. Another of these steps involves storing data at a second address in the memory. Yet another of these steps involves determining if a memory conflict has occurred between the first address and the second address using the previously stored memory conflict information. If a memory conflict occurred between the first and second addresses, then one of the registers is reloaded with the data located at the first address. However, if a memory conflict did not occur between the first and second addresses, then the memory conflict information is left for use during subsequent memory conflict checks. According to one embodiment of the invention, the data is reloaded into a register by causing the computer system to branch to recovery code. According to another embodiment of the invention, the data is reloaded into a register without performing any branch instructions.

According to another aspect of the invention, a processor includes a decode unit coupled to a set of registers and a memory conflict resolution unit. The decode unit is configured to decode a check instruction. The memory conflict resolution unit includes a conflict resolution circuit coupled to a table. The table includes a plurality of storage areas, each being capable of storing a memory conflict entry. The conflict resolution circuit is configured to poll at least some of the memory conflict entries in the table responsive to the decoding of the check instruction to determine whether a memory conflict involving a register identified by an operand of the check instruction was recorded. If a memory conflict was recorded, the memory conflict resolution circuit causes the processor to correct for the memory conflict. Otherwise, the memory conflict resolution circuit causes the processor to complete execution of the check instruction without altering the memory conflict entries in the table. According to one embodiment of the check instruction, the memory conflict resolution circuit causes the processor to correct for the memory conflict by causing the processor to branch to recovery code. According to another embodiment of the check instruction, the correcting for the memory conflict is performed as part of the execution of the check instruction.

BRIEF DESCRIPTION OF THE DRAWINGS

The invention may best be understood by referring to the following description and accompanying drawings which illustrate the invention. In the drawings.

DETAILED DESCRIPTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

A method and apparatus for implementing check instructions that allow for the reuse of memory conflict information if no memory conflict occurs is described. In one embodiment, one or more additional check instructions (referred to herein as the "check no-invalidate" instructions) are included in the instruction set. The check no-invalidate instructions are similar to previous check instructions in that they determine whether a memory conflict has occurred based on previously stored memory conflict information. However, unlike previous check instructions, the check no-invalidate instructions do not invalidate any conflict information if no memory conflict occurred. By using these check no-invalidate instructions, whenever there is a loop including a load instruction and one or more undisambiguatable store instructions, the scheduled code can have a preload instruction outside of the loop, rather than leaving the preload instruction inside the loop. This is accomplished by placing a check no-invalidate instruction inside the loop, rather than a check instruction which invalidates the memory conflict information.

In one embodiment of the invention, two check no-invalidate instructions are supported, the "check no-invalidate branch" and the "check no-invalidate reload instruction." If a memory conflict occurs, execution of the check no-invalidate reload instruction causes the processor to reload the improperly loaded data as part of the execution of the check no-invalidate reload instruction (i.e., without branching to recovery code). In contrast, execution of the check no-invalidate branch instruction causes the processor to branch to recovery code when a memory conflict is detected. Of course, alternative embodiments could support only one of the check no-invalidate instructions. In addition, alternative embodiment could support a hybrid of the check no-invalidate branch instruction and the check no-invalidate reload instruction that causes the processor to both reload the data as part of the execution of the check instruction and branch to corresponding recovery code.

Figure 3:
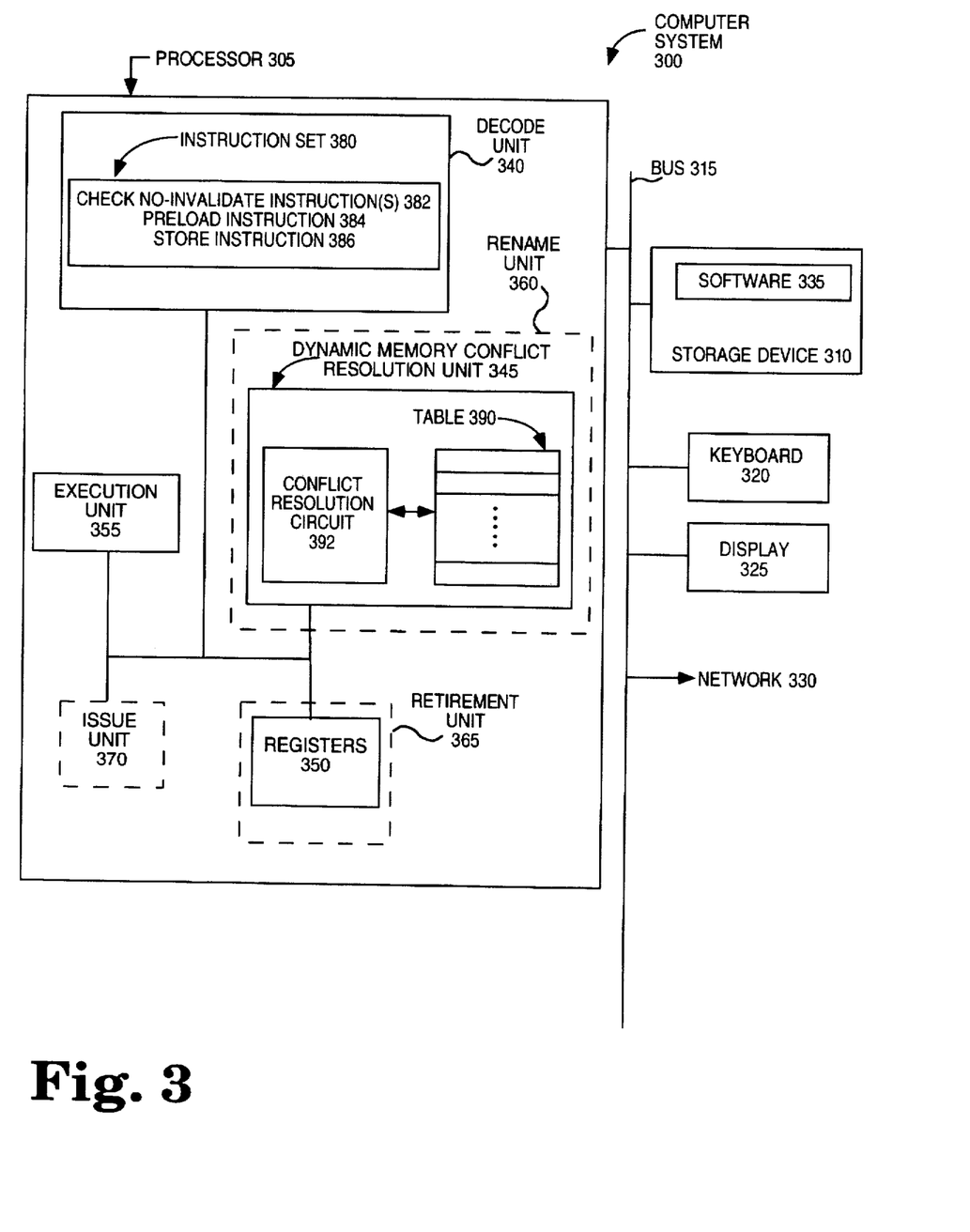
FIG. 3 shows a block diagram illustrating an exemplary computer system according to one embodiment of the invention.

FIG. 3 shows a block diagram illustrating an exemplary computer system 300 according to one embodiment of the invention. The exemplary computer system 300 includes a processor 305 coupled to a storage device 310 by a bus 315. In addition, a number of user input/output devices, such as a keyboard 320 and a display 325, may also be coupled to the bus 315, but are not necessary parts of the invention. A network 330 may also be coupled to the bus 315. The processor 305 represents a central processing unit of any type of architecture, such as a CISC, RISC, VLIW, or hybrid architecture. In addition, the processor 305 could be implemented on one or more chips. The storage device 310 represents one or more mechanisms for storing data. For example, the storage device 310 may include read only memory (ROM), random access memory (RAM), magnetic disk storage media (e.g., a floppy disk, a hard disk, etc.), optical storage media, flash memory devices, and/or other machine-readable media. The bus 315 represents one or more busses (e.g., PCI, ISA, X-Bus, EISA, VESA, etc.) and bridges (also termed as bus controllers). While this embodiment is described in relation to a single processor computer system, the invention could be implemented in a multi-processor computer system. In addition, while this embodiment is described in relation to a 64-bit computer system, the invention is not limited to a 64-bit computer system.

FIG. 3 also illustrates that the storage device 310 has stored therein software 335 for execution on the processor 305. The software 335 represents one or more of: 1) the check no-invalidate instruction(s); 2) compiled code including the check no-invalidate instruction(s); and 3) a compiler designed for generating compiled code that includes the check no-invalidate instruction(s). Of course, the storage device 310 preferably contains additional software such as an operating system and various applications (not shown), which are not necessary to understanding the invention.

FIG. 3 additionally illustrates that the processor 305 includes a decode unit 340, a dynamic memory conflict resolution unit 345, a set of registers 350, and an execution unit 355. The processor 305 can optionally include a rename unit 360 (that includes the dynamic memory conflict resolution unit 345), a retirement unit 365 (that includes the set of registers 350), and an issue unit 370. Of course, processor 305 contains additional circuitry, which is not necessary to understanding the invention.

One or more buses couple the elements of the processor 305 together as shown. The decode unit 340 is used for decoding instructions received by the processor 305 into control signals and/or microcode entry points. In response to these control signals and/or microcode entry points, the elements of the processor 305 perform the appropriate operations. The decode unit 340 may be implemented using any number of different mechanisms (e.g., a look-up table, a hardware implementation, a PLA, etc.). While the decoding of the various instructions is sometimes represented herein by a series of if/then statements, it is understood that the execution of an instruction does not require a serial processing of these if/then statements. Rather, any mechanism for logically performing this if/then processing is considered to be within the scope of the implementation of the invention.

The processor 305 is capable of recognizing, decoding, and executing an instruction set 380. In one embodiment, the instruction set 380 includes the check no-invalidate (checkni) instruction(s) 382, a preload instruction 384 (also termed an advanced load instruction), and a store (store) instruction 386. The operation of each of these instructions is further described herein. Of course, the instruction set 380 includes additional instructions not necessary to understanding the invention. For example, in one embodiment the processor 305 supports an instruction set which is compatible with the Intel® Architecture instruction set used by existing processors, such as the Pentium® processor. In addition, embodiments may also include one or more types of check invalidate (check) instructions that causes the processor to invalidate a memory conflict entry if no memory conflict is detected. One type of check invalidate instruction could cause the processor to branch to recovery code if a memory conflict was detected, while another type of check invalidate instruction could cause the processor to reload the preloaded value as part of the execution of that check instruction if a memory conflict was detected.

The registers 350 represent a storage area on the processor 305 for storing information (e.g., control/status information, integer data, floating point data, packed data, etc.). The rename unit 360, retirement unit 365, and issue unit 370 represent mechanisms for implementing register renaming and out-of-order execution, but these are optional.

The dynamic memory conflict resolution unit 345 is any mechanism used for performing dynamic memory disambiguation. For example, one embodiment includes a mechanism similar to the memory conflict buffer of Gallagher described in the Background section above. Other examples of mechanisms represented by the dynamic memory conflict resolution unit 345 are described below. The dynamic memory conflict resolution unit 345 includes one or more table(s) 390, as well as a memory conflict resolution circuit 392 for storing memory conflict entries in the table(s) 390. Regardless of the type of mechanism used, execution of the check no-invalidate instruction(s) 382 does not result in invalidating the corresponding memory conflict entry.

Figure 4:
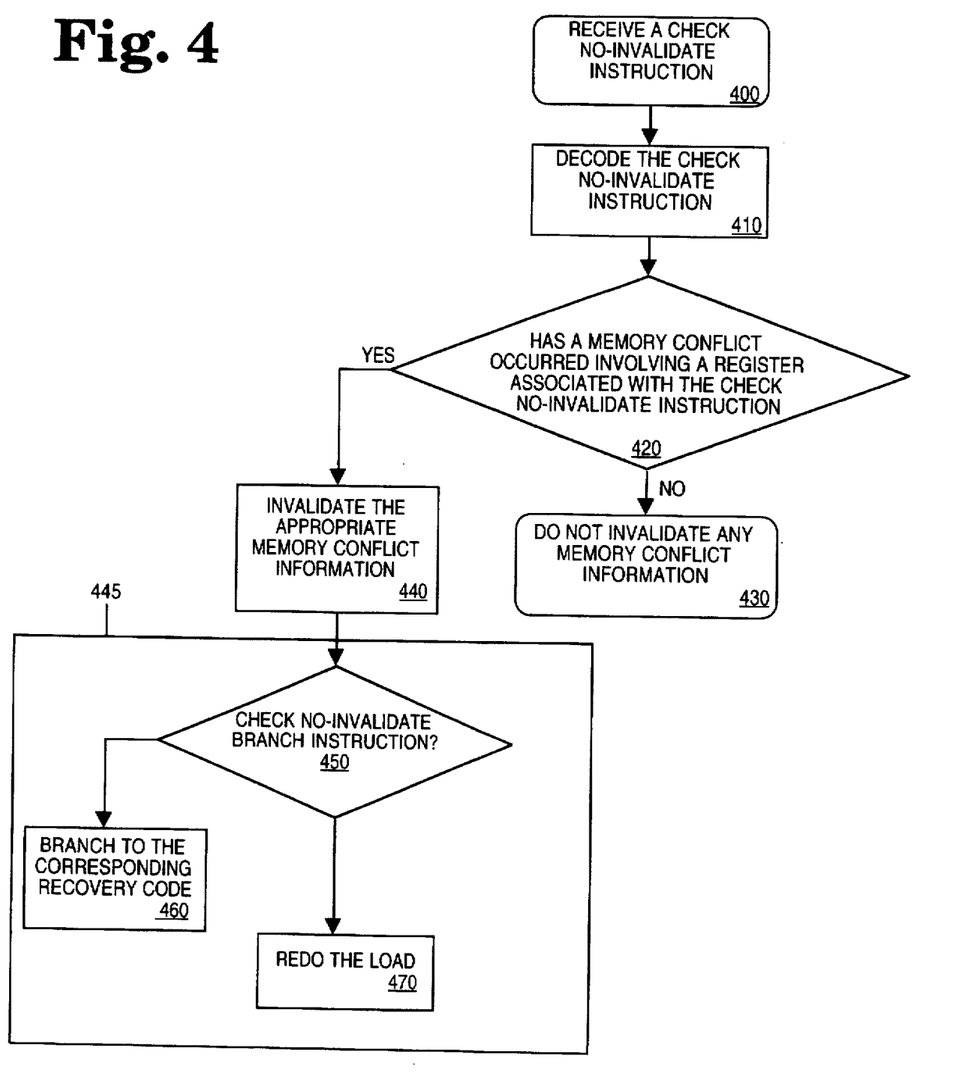
FIG. 4 is a flow diagram illustrating a method of performing the check no-invalidate instructions according to one embodiment of the invention.

FIG. 4 is a flow diagram illustrating a method of performing the check no-invalidate instructions according to one embodiment of the invention. The flow diagram starts at step 400, where a check no-invalidate instruction is received. From step 400, flow passes to step 410.

As shown in step 410, the check no-invalidate instruction is decoded and flow passes to step 420. At step 420, the dynamic memory conflict resolution unit 345 determines whether a memory conflict occurred involving a register associated with the check no-invalidate instruction. In one embodiment, the format of the check no-invalidate instructions is similar to that of the check instruction described in the background. For example, the format of the check no-invalidate branch instruction can be CHECKNI-B R#, label, where R# is a general purpose register number, and label specifies a starting address of the recovery code supplied by the compiler (e.g., label is an offset to the starting address of the recovery code). In contrast, the format of the check no-invalidate reload instruction can be CHECKNI-R R#, address, where R# is a general purpose register number, and address is the data address of the preload instruction corresponding to the check no-invalidate reload instruction. Execution of either check no-invalidate instruction causes examination of the memory conflict information associated with the register R#. Since there are a number of ways of storing this memory conflict information (several of which will be discussed later herein), this step may be performed in a number of ways. However, as an example, this step would be performed with the memory conflict buffer described in the Background by examining the conflict bit in the conflict vector corresponding to register R#. If a conflict did not occur, flow passes to step 430. Otherwise, flow passes to step 440.

As shown in step 430, execution of the check no-invalidate instruction is completed without invalidating any memory conflict information. As a result, the memory conflict information associated with register R# can be used in performing subsequent memory conflict checks (e.g., during subsequent iterations of a loop). This is unlike the prior check instruction that invalidates the memory conflict information (see step 130 of FIG. 1), thereby making it unusable in future memory conflict checks. However, alteration of the memory conflict information is acceptable in step 430 as long as the memory conflict information is still in a condition that allows for subsequent memory conflict checks. The technique of not invalidating the memory conflict information will vary depending on the mechanism used in performing dynamic memory disambiguation. In relation to the memory conflict buffer described in the background, invalidation of the memory conflict information can be avoided by implementing an additional instruction which does not reset the valid bit when a conflict is not detected. Additional mechanisms for performing dynamic memory disambiguation, as well as techniques for not invalidating the memory conflict information are described later herein. The term validity indication is used to refer to any data (e.g., a bit, a string of bits) used to identify whether memory conflict information is valid.

In step 440, the corresponding memory conflict information is invalidated, if necessary, and control passes to step 450 inside step 445. The corresponding memory conflict information is any memory conflict information that was generated to record any memory conflicts that resulted in the wrong information being loaded into the register R#. As previously stated, the technique for invalidating this memory conflict information varies depending on the mechanism used to perform the dynamic memory conflict checks. In the memory conflict buffer scheme of Gallagher, for example, the valid bit in the preload array entry identified by the preload pointer in the conflict array is reset.

In step 445, any problems caused by the memory conflict are corrected. Any number of different techniques may be used for correcting the problems caused by a memory conflict. Steps 450, 460, and 470 illustrate two such techniques as examples.

If the instruction is a check no-invalidate branch instruction, control passes from step 450 to step 460 where a branch to the corresponding recovery code is performed. The branch to the corresponding recovery code is performed by branching to the instructions stored starting at label. Upon completion of step 460, the flow diagram ends and execution of the check no-invalidate branch instruction completes.

If the instruction is a check no-invalidate reload instruction, control passes from step 450 to step 470 where the load is redone. Upon completion of step 470, the flow diagram ends and execution of the check no-invalidate reload instruction completes. Since the data is reloaded as part of the check no-invalidate reload instruction, a branch to recovery code and a branch back from that recovery code is not required. Since the execution of branches is expensive, the removal of these branches improves execution efficiency.

Any number of different mechanisms can be used to causes a processor to branch or reload depending on whether a memory conflict was detected. For example, in one embodiment of a processor that supports opcodes, the opcodes for the branch and preload instructions include a bit that indicates if the opcode is valid or invalid. As the instruction progresses through the processor'execution stream, the bit in the opcode can be altered to validate and/or invalidate the opcode. An invalid opcode is not executed. Upon receiving a check no-invalidate branch instruction, a branch instruction whose execution will cause the processor to branch to the label specified in the check no-invalidate branch instruction is inserted into the processor's execution stream. Depending on whether a memory conflict is detected for the check no-invalidate branch instruction, the validity bit in the branch instruction's opcode is altered accordingly. The same approach used for the check no-invalidate branch instruction can be used for the check no-invalidate reload instruction. Thus, upon receiving a check no-invalidate reload instruction, a preload instruction whose execution will cause the processor to reload the data at the data address specified in the check no-invalidate reload instruction is inserted into the processor's execution stream.

In order to take advantage of the check no-invalidate instructions, the compiler must properly compile the source code. The compilation of source code includes a loop analysis and transformation stage in addition to a scheduling stage. The loop analysis and transformation stage is performed prior to the scheduling stage to identify and transform loops in the source code. Techniques for identifying loops are well known. Unlike the scheduling stage, source code instructions can be moved outside of a loop during the loop analysis and transformation stage.

Figure 5:
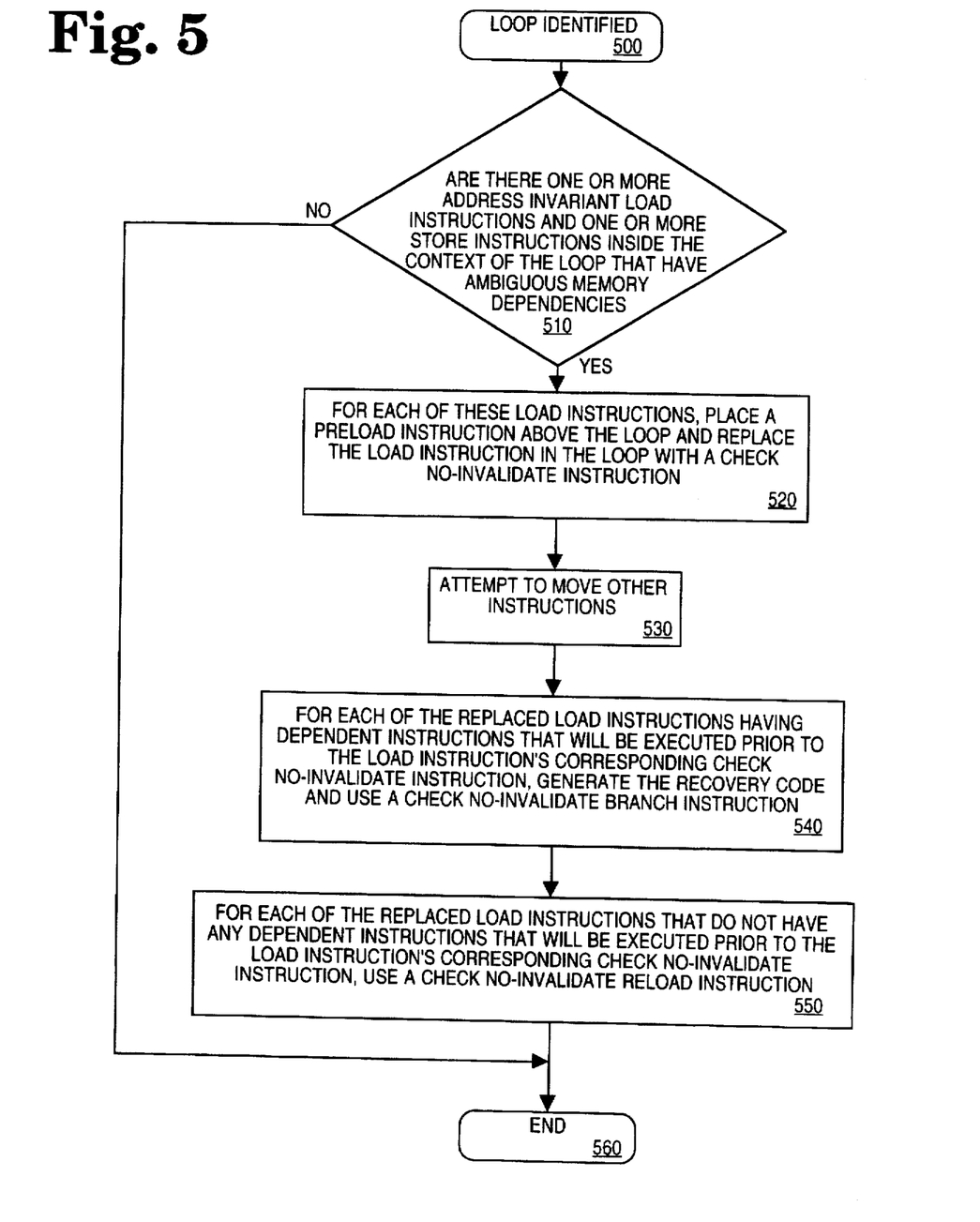
FIG. 5 is a flow diagram illustrating a method for compiling code inside a loop to take advantage of the check no-invalidate instructions according to one embodiment of the invention.

FIG. 5 is a flow diagram illustrating a method for compiling code inside a loop to take advantage of the check no-invalidate instructions according to one embodiment of the invention. The flow diagram starts at step 500 from which flow passes to step 510.

In step 510, it is determined if there are one or more address invariant load instructions and one or more store instructions inside the context of the loop that have ambiguous memory dependencies. Step 510 is performed by first inspecting each instruction to determine if it is a load or store instruction. Second, the operands of the identified load and store instructions are compared to determine if there are any ambiguous memory dependencies. If it is determined that there is at least one load instruction and one or more ambiguous store instructions, control passes from step 510 to step 520. Otherwise, control passes to step 560 where the flow diagram ends.

As shown in step 520, for each of the load instructions identified in step 510, a preload instruction is placed above the loop and the load instruction inside the loop is replaced with a check no-invalidate instruction. From step 520, flow passes to step 530.

In step 530, other instructions within the loop are moved if possible and/or advantageous and control passes to step 540. For example, an instruction that is dependent on a moved load instruction may be moved: 1) above the load instruction's corresponding check no-invalidate instruction; 2) across loops iterations; 3) out of the loop with the preload instruction if the dependent instruction is loop invariant; etc.

As shown in step 540, for each of the load instructions having dependent instructions that will be executed prior to the moved load instruction's corresponding check no-invalidate instruction, a check no-invalidate branch instruction is used inside the loop and the corresponding recovery code is generated. The recovery code for each of the load instructions identified in step 540 includes a preload instruction to reload the data and any dependent instructions that will be executed prior to the load instruction's corresponding check no-invalidate branch instruction. From step 540, control passes to step 550.

In step 550, for each of the moved load instructions that do not have any dependent instructions that will be executed prior to the load instruction's corresponding check no-invalidate instruction, a check no-invalidate reload instruction is used inside the loop. From step 550, control passes to step 560 where the flow diagram ends.

After completing the loop analysis and transformation stage, the scheduling stage is eventually performed. In one embodiment, the scheduling stage in performed using the scheduling algorithm of Gallagher. By using the scheduling algorithm of Gallagher, any remaining load instructions and ambiguous store instructions can be reordered using preload and check invalidate instructions.

It is worthwhile to note, that in one embodiment of the invention any check no-invalidate instructions inserted into the compiled code cannot be moved across any ambiguous stores. For example, if a load instruction follows a store instruction in the source code, the check no-invalidate instruction that replaces the load instruction cannot be moved above the store instruction. Similarly, if a load instruction precedes a store instruction in the source code, the check no-invalidate instruction that replaces the load instruction cannot be moved below the store instruction. Thus, when building the dependence graph during the scheduling stage, dependence arcs must be properly created to prevent the movement of check no-invalidate instructions across ambiguous stores.

Table 4 shows assembly code and two examples of reordered assembly code scheduled according to the method described with reference to FIG. 5. The first example in Table 4 shows reordered assembly code for a check no-invalidate branch instruction, while the second example shows reordered assembly code for a check no-invalidate reload instruction. As shown in both examples, the preload instruction is placed outside of the loop and a check no-invalidate instruction is inserted inside the loop. While the load instruction in the assembly code is shown following the store instruction, the load instruction could be above the store instruction, but still within the loop. If the load instruction is above the store instruction in the assembly code, the check no-invalidate instruction would be above the store instruction. In such a case, the store instruction from a subsequent iteration of the loop could result in a memory conflict and the check no-invalidate instruction would be checking the store from the previous iteration of the loop. In addition, while the examples in Table 4 contains one load and one store instruction, assembly code containing multiple load and store instructions could be compiled in the same manner using check no-invalidate branch instructions and/or check no-invalidate reload instructions.

TABLE 4

| Assembly Code | Reordered Assembly Code for Check No-Invalidate Branch Instruction | Reordered Assembly Code for Check No-Invalidate Reload Instruction |
|---|---|---|
| ———> | Preload R3 <– \|R4\| | Preload R3 <– \|R4\| |
| \| . | . | . |
| \| . | . | . |
| \| . | ———> | ———> |
| \| . | \| . | \| . |
| \| Store R1–>\|R2\| | \| . | \| . |
| \| Load R3<–\|R4\| | \| . | \| . |
| \| . | \| . | \| . |
| \| . | \| Store R1 –> \|R2\| | \| Store R1 –> \|R2\| |
| \| . | \| Checkni-B R3, | \| Checkni-R R3, |
| —LOOP | Correct | Address |
| | \| Back: | \| . |
| | \| . | \| . |
| | \| . | \| . |
| | \| . | —LOOP |
| | —LOOP | |
| | Correct: | |
| | Preload R3 <– \|R4\| | |
| | . | |
| | . | |
| | Jmp Back | |

Execution of the preload instruction prior to the beginning of the loop loads the data and generates memory conflict information associated with the register into which that data was loaded. Assuming no conflicts result from the execution of the store instruction during the first iteration of the loop, execution of the store instruction will not alter that conflict information and execution of either check no-invalidate instructions will not invalidate that memory conflict information. As a result, the memory conflict information is available for performing memory conflict checks during the second iteration of the loop, and so on. Thus, if no memory conflicts arise during the execution of the loop, the preload instruction will be executed only once.

Assuming a conflict is detected, execution of the check no-invalidate branch instruction results in a branch to the corresponding recovery code. Since this corresponding recovery code includes the preload instruction, the data is reloaded and new memory conflict information is generated. As a result, this memory conflict information will again be available during execution of the loop. Therefore, the recovery code and the preload instruction need to be re-executed only if and when the next memory conflict is detected.

Again assuming a conflict is detected, execution of the check no-invalidate reload instruction results in a preload being performed to reload the data and create new memory conflict information. As a result, no branches are required and the memory conflict information is again be available during execution of the loop. As illustrated by these examples, performance of the compiled code may be improved.

Figure 6:
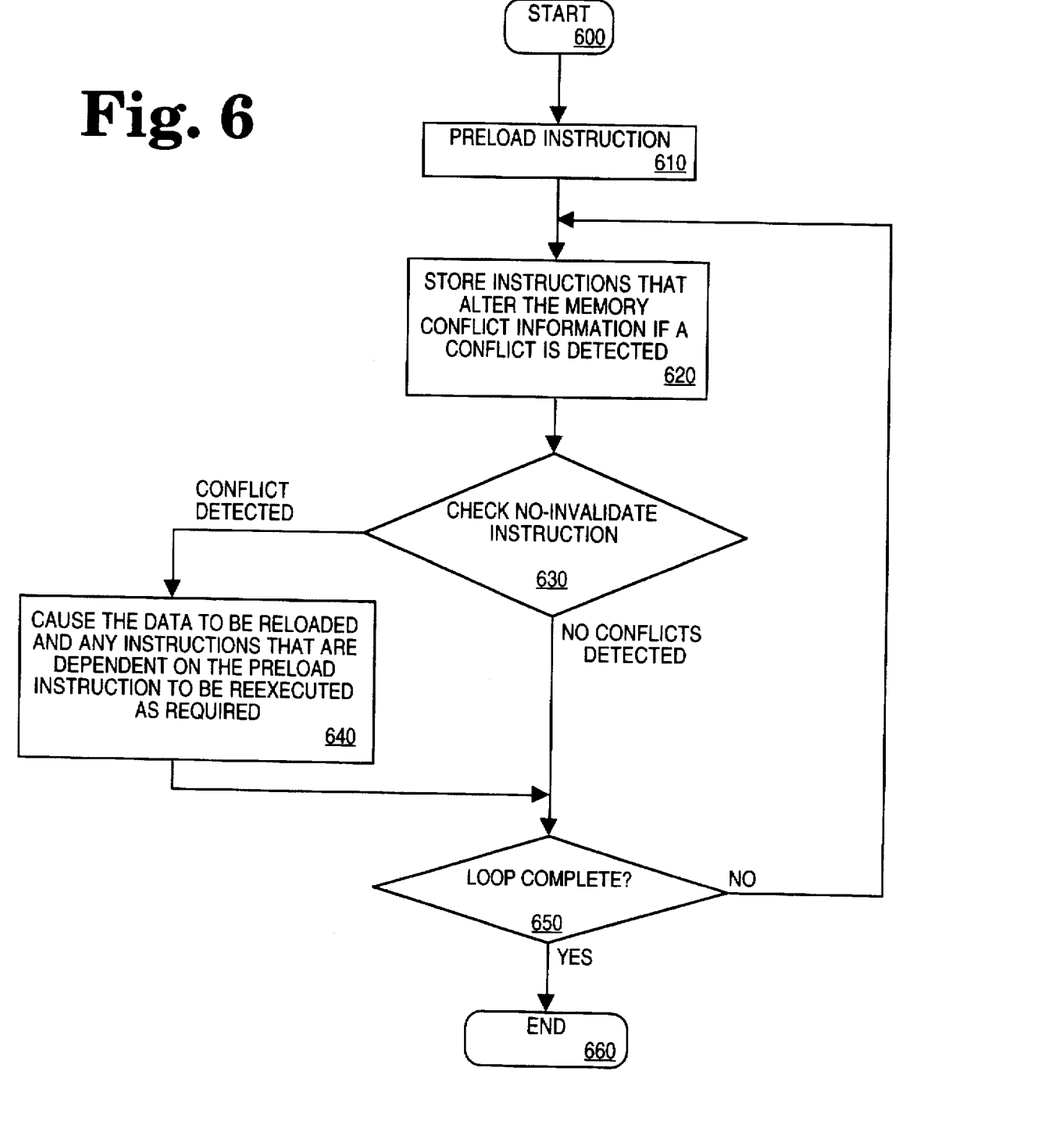
FIG. 6 is a flow diagram illustrating the execution of a loop according to one embodiment of the invention.

FIG. 6 is a flow diagram illustrating the execution of a loop according to one embodiment of the invention. For example, the example loops shown in Table 4 would be executed according to this method. While the flow diagram described with reference to FIG. 6 contains a single preload instruction, code containing multiple preload instructions outside the loop would be executed in a similar manner. The flow diagram starts at step 600, from which flow passes to step 610. As shown in step 610, a preload instruction is executed. From step 610, flow passes to step 620. It is worthwhile to note that step 610 occurs prior to the first iteration of the loop.

As shown in step 620, any ambiguous store instructions which the preload instruction has been scheduled above are executed. During execution of each of these store instructions, it is determined whether a memory conflict has occurred. If such a memory conflict has occurred during the execution of a store instruction, the corresponding memory conflict information is altered to record that conflict. From step 620, flow passes to step 630.

In step 630, the preload instruction's corresponding check no-invalidate instruction is executed. If a conflict is detected, flow passes to step 640. However, if no conflicts were detected, flow passes to step 650 and the memory conflict information is not invalidated.

At step 640, the data is reloaded and any instructions that are dependent on the preload instruction are re-executed as required (any erroneous results generated as a result of the memory conflict are corrected). If a check no-invalidate branch instruction was executed, the corresponding recovery code (including a preload instruction and any required dependent instructions) is executed. If a check no-invalidate instruction was executed, the data is reloaded as part of the execution of the check no-invalidate reload instruction. Whether a check no-invalidate branch instruction or a check no-invalidate reload instruction was executed, the data is reloaded and new memory conflict information is generated. From step 640, flow passes to step 650.

In step 650, it is determined whether the loop is complete. If the loop is complete, flow passes to step 660 where the flow diagram ends. Otherwise, flow passes back to step 620. Of course, additional instructions may be executed in-between the various steps of this flow diagram and/or in between the store instructions of step 620. Also, the recovery code may contain additional instructions that were moved above the check no-invalidate instruction or out of the loop to the block that contains the preload instruction from step 610.

As previously stated, there are a number of different mechanisms that can be used to implement the dynamic memory conflict resolution unit 345 of FIG. 3. Each mechanism may store different memory conflict information and/or invalidate that memory conflict information in a different manner. One such alternative mechanism is referred to herein as the ALAT (Advanced Load Address Table). Unlike the memory conflict buffer of Gallagher which has a conflict vector and a preload array, the ALAT is comprised of a single table having a number of storage areas. Each storage area in the table is used for storing memory conflict information (also termed as memory conflict entry) concerning a preload instruction. This table may be implemented using any form of cache. Each memory conflict entry in this table includes a location identifier field, a signature field, a width field, and a valid indication field. The location identifier field stores information (e.g., a register number) identifying the storage location of data that was loaded by a preload instruction.

Like the signature and width fields of the memory conflict buffer of Gallagher, a signature field of the ALAT contains a hashed version of the preload address and the width field contains the preload address width. In contrast to the valid bit of the memory conflict buffer, the valid indication field stores data used both for indicating whether a memory conflict has occurred and whether the memory conflict information is valid. Due to the manner in which the ALAT is operated, the valid indication field can be comprised of a single bit. In one embodiment, this bit is set to 1 to indicate that no memory conflict has occurred and that the memory conflict information is valid. However, this bit is set to 0 to indicate that a memory conflict has occurred and/or that the memory conflict information is invalid.

Upon execution of a preload instruction, the corresponding memory conflict information is stored in a storage area of the ALAT. The valid indication of this memory conflict information is set to indicate that the memory conflict information is valid and that no conflict has yet been detected. Selecting the appropriate storage area in the ALAT for storing this memory conflict entry can be performed using any number of techniques. For example, if the ALAT is set-associative, the technique for selecting the storage area in the ALAT is identical to that of selecting a storage area in a set-associative cache. For example, if no invalid memory conflict entry exists, one embodiment uses a random replacement algorithm to select which memory conflict entry to replace. If this occurs, there is no longer safe disambiguation for the preload which is being removed from the array. As a result, it is assumed that a "load-load" memory conflict has occurred for this preload. In contrast, if an invalid memory conflict entry exists, the invalid memory conflict entry is overwritten with the new memory conflict entry.

Upon the subsequent execution of an ambiguous store instruction, the address from which data is to be accessed is hashed in an identical manner as the preload addresses. The hashed store address and store width are then compared to the signature and width fields of the appropriate entries in the ALAT (e.g., if a set-associative table is used, then the appropriate entries are those in the selected set). This comparison can be implemented in the same manner or in a similar manner as described with reference to the Gallagher reference. Due to the fact that the addresses are hashed, there are two types of conflicts that occur: true conflicts and false conflicts. A true conflict occurs when the load and store addresses actually overlap, while a false conflict results when the load and store addresses are actually different but the conflict resulted from the hashing scheme used. In such an embodiment, the mechanism actually determines potential conflicts as opposed to actual conflicts. Of course, an alternative embodiment could store the actual address (as opposed to a hashed signature) to avoid false conflicts from being detected. Thus, the invention at least detects true conflicts, and certain embodiments of the invention additionally detect potential conflicts.

If a memory conflict is detected during the execution of a store instruction, the valid indication of the appropriate memory conflict entry is altered to indicate that the conflict was detected. Otherwise, the memory conflict information is not altered. In an alternative embodiment, the memory conflict entries do not include a valid indication field. Rather, the detection of a conflict during the execution of a store instruction results in the deletion of the memory conflict entry.

Upon execution of a check invalidate or a check no-invalidate instruction, the location identifier field of the appropriate entries of the ALAT are compared with the register number identified by the check instruction. No matching entry will be found in situations where a load-load conflict has occurred and the entry was overwritten for lack of another storage area in the ALAT to be used. Alternatively, in the previously described embodiment which does not include the valid indication field, an entry will be erased upon execution of a store instruction that resulted in a memory conflict. If no match is found, it is assumed a conflict has occurred.

However, if a matching entry is found, then the valid indication of that entry is polled. If the valid indication is in the conflict/invalid state, a conflict has occurred and the check instructions cause the processor to either repeat the load or branch to the recovery code, depending on the type of check instruction executed. In contrast, if the valid indication is in the no conflict/valid state, no conflict was detected. In this situation, the check invalidate and the check no-invalidate instructions cause the processor to perform differently. In the case of a check invalidate instruction, the processor alters the valid indication to indicate the memory conflict information is invalid and marks the storage area storing that memory conflict information as available for new memory conflict information. In the alternative embodiment in which there is no valid indication field, the entry is simply erased. In contrast, when a check no-invalidate instruction is executed, the memory conflict entry is not invalidated—the valid indication is not altered and the memory conflict information is not erased.

Figure 7:
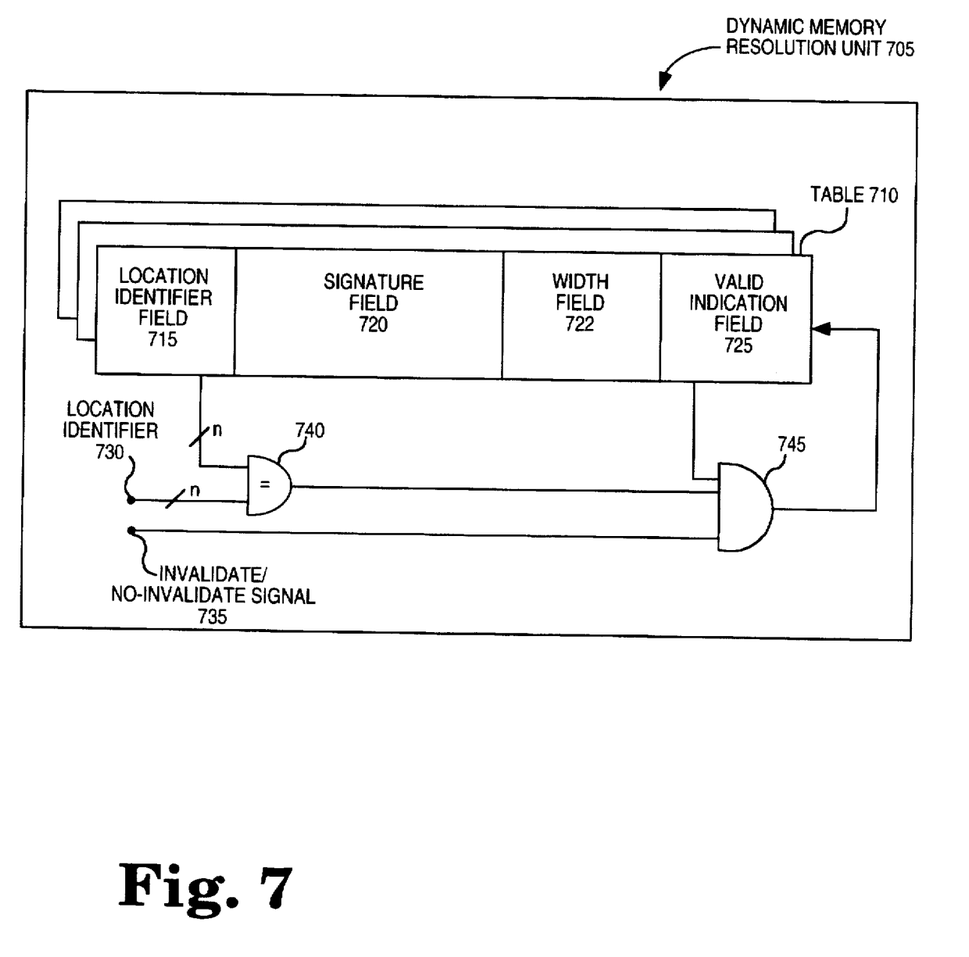
FIG. 7 illustrates a circuit for selectively invalidating the memory conflict entries of the ALAT according to one embodiment of the invention.

FIG. 7 illustrates a circuit for selectively invalidating the memory conflict entries of the ALAT according to one embodiment of the invention. FIG. 7 shows a dynamic memory conflict resolution unit 705. The dynamic memory conflict resolution unit 705 may be used for the dynamic memory conflict resolution unit 345 of FIG. 3. While the dynamic memory conflict resolution unit 705 includes various circuitry, only the necessary circuitry for describing the invention is shown.

The dynamic memory conflict resolution unit 705 is shown including a table 710 for storing the memory conflict entries. Although only one storage area in the table 710 is being described, each of the storage areas in the table 710 has associated with it a set of comparators (740) and an AND gate (745). Each memory conflict entry stored in table 710 has a location identifier field (715), a signature field (720), a width field (722), and a valid indication field (725).

Upon receipt of either a check no-invalidate or a check invalidate instruction, the register R# identified by the check instruction is extracted. Depending on the implementation, either R# or some data derived from this R# (e.g., if register renaming is used, the register number of the renamed register) becomes the location identifier for the check instruction. This location identifier is asserted at node 730, and subsequently received as an input to the comparators 740 for comparison with the data stored in the location identifier field 715 (of each entry in the table 710). If there is a match, a logic-1 signal is transmitted to an input of the AND gate 745. Otherwise, a logic-0 is transmitted.

In response to execution of the check invalidate and the check no-invalidate instructions, the decode unit generates an invalidate/no-invalidate signal. The invalidate/no-invalidate signal is eventually asserted at node 735, and subsequently received as an input to the AND gate 745. In this embodiment, the invalidate/no-invalidate signal is logic-1 if a check invalidate instruction was received and is logic-0 if a check no-invalidate instruction is received. The AND gate 745 also receives the contents of the valid indication field 725 as an input. Assuming the memory conflict entry corresponds to the check instruction being executed (the location identifier matches the data stored in the location identifier field) and the data stored in the valid indication field 725 indicates the memory conflict entry is valid, then the output of the AND gate 745 depends upon whether the invalidate/no-invalidate signal indicates a check invalidate or a check no-invalidate instruction was received. If a check invalidate instruction was received, the invalidate/no-invalidate signal is logic-1 and the AND gate 745 outputs a logic-1. In response to receiving the output of a logic-1 from AND gate 745, the table 710 alters the data in the valid indication field 725 to the conflict/invalid state. In contrast, if a check no-invalidate instruction was received, the invalidate/no-invalidate signal is logic-0 and the AND gate 745 outputs logic-0. In response to receiving logic-0 as the output of the AND gate 745, the dynamic memory conflict resolution unit 705 does not modify the valid indication.

Of course, there are numerous variations of the circuitry shown in FIG. 7. For example, the signals may be inverted and the logic gates may be altered accordingly. As another example, in an embodiment which does not implement the valid indication field, the circuitry would be implemented to erase the entire memory conflict entry. Furthermore, circuitry similar to that shown in FIG. 7 could be used to implement the check no-invalidate instruction(s) in the memory conflict buffer of Gallagher. For example, the decode unit would be implemented to decode additional instruction(s) (one or more check no-invalidate instruction) and to generate a signal indicating whether a check invalidate or a check no-invalidate instruction is being executed. In addition, the entries of the preload array would be altered such that the valid bit would not be reset upon the execution of a check no-invalidate instruction, but would be reset upon execution of a check invalidate instruction.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A machine-readable medium having stored thereon data representing sequences of instructions, said sequences of instructions which, when executed by a computer system, cause said computer system to perform steps of:

A) preloading one of a set of registers with data retrieved from a memory, wherein the data being preloaded is located at a first address in said memory;

B) storing memory conflict information representing said first address for use in subsequent memory conflict determinations;

C) storing data at a second address in said memory, wherein said first address may be the same as said second address;

D) determining if a memory conflict has occurred between said first address and said second address using said memory conflict information;

E) if it was determined that said memory conflict has occurred, then reloading one of said set of registers with data located at said first address in said memory; and F) if it was determined that said memory conflict has not occurred, leaving said memory conflict information valid for subsequent memory conflict checks.

2. The machine-readable medium of claim 1, wherein said step of determining further includes the steps of:

D1) detecting whether said memory conflict has occurred between said first address and said second address using said memory conflict information;

D2) if said memory conflict has occurred, altering or deleting said memory conflict information to indicate said memory conflict has occurred; and D3) subsequently determining if said memory conflict has occurred by polling said memory conflict information.

3. The machine-readable medium of claim 1, said sequences of instructions, when executed by said computer system, cause said computer system to perform the additional step of:

G) repeating steps C through F until a predetermined condition is met.

4. The machine-readable medium of claim 3, wherein said step of repeating includes the step of altering at least said second address or the data located at said second address in said memory.

5. The machine-readable medium of claim 1, wherein said step of leaving includes the step of not invalidating said memory conflict information.

6. The machine-readable medium of claim 1, wherein said step of reloading includes the step of:

E1) executing recovery code.

7. The machine-readable medium of claim 1, wherein said step of reloading includes the step of:

E1) storing new memory conflict information representing said first address for use in subsequent memory conflict determinations.

8. The machine-readable medium of claim 1, wherein said step of reloading is performed without performing a branch.

9. A processor comprising:

a plurality of registers;

a decode unit, coupled to said plurality of registers, configured to decode a check instruction; and a memory conflict resolution unit, coupled to said decode unit, including, a table having a plurality of storage areas, each storage area of the plurality of storage areas being configured to contain a memory conflict entry used for detecting memory conflicts, and a conflict resolution circuit coupled to said table, configured to poll at least some of said plurality of memory conflict entries responsive to said decoded check instruction to determine whether a memory conflict involving one of said plurality of registers identifiable using a field in said decoded check instruction was recorded, said conflict resolution circuit causing said processor to correct for the memory conflict if said memory conflict has occurred, otherwise said conflict resolution circuit causing said processor to complete execution of said decoded check instruction without altering said plurality of memory conflict entries.

10. The processor of claim 9, wherein said plurality of storage areas is a set-associative cache.

11. The processor of claim 9, wherein each memory conflict entry of said plurality of memory conflict entries includes a location identifier field from which a location containing data loaded in response to an ambiguous load can be determined.

12. The processor of claim 9, wherein said conflict resolution circuit includes a plurality of sets of comparators each corresponding to a different one of said plurality of storage areas in said table, each said set of comparators coupled to determine if a first of said plurality of registers identified by a field in said corresponding memory conflict entry matches the one of the plurality of registers identified by said field in said check instruction.

13. The processor of claim 9, wherein said conflict resolution circuit causes said processor to correct for the memory conflict by causing said processor to branch.

14. The processor of claim 9, wherein said conflict resolution circuit causes said processor to correct for the memory conflict by causing said processor to reload data affected by the memory conflict into said plurality of registers as part of the execution of said decoded check instruction.

15. A computer system comprising:

a storage device having stored therein a routine;

a bus coupled to said storage device; and a processor coupled to said bus for executing a check instruction in said routine, said processor including, a plurality of registers, and a memory conflict resolution unit configured to determine whether a memory conflict involving one of said plurality of registers identified by said check instruction has occurred in response to executing said check instruction, said processor correcting for said memory conflict if said memory conflict has occurred, otherwise said processor completing execution of said check instruction with all previously existing entries of said memory conflict resolution unit pertaining to said identified register in a state usable for subsequent potential memory conflict determinations.

16. The processor of claim 15, wherein said memory conflict resolution unit causes said processor to correct for the memory conflict by causing said processor to branch to corresponding recovery code in said routine.

17. The processor of claim 15, wherein said memory conflict resolution unit causes said processor to correct for the memory conflict by causing said processor to reload data affected by the memory conflict into said plurality of registers as part of the execution of said check instruction.

18. A processor comprising:
    a decoder means for decoding a check instruction; and
    a memory conflict resolution means including a recordation means for recording information used to determine if any memory conflicts have occurred, said memory conflict resolution means responsive to execution of said check instruction for detecting if a memory conflict involving data loaded into a register identified with said check instruction has been detected and for leaving all previously existing entries of said recordation means pertaining to said register in a state usable for subsequent memory conflict determinations if said memory conflict has not been detected.

19. The processor of claim 18, wherein said memory conflict resolution means responsive to execution of said check instruction is also for causing said processor to correct for the memory conflict by causing said processor to branch to corresponding recovery code if said memory conflict is detected.

20. The processor of claim 18, wherein said memory conflict resolution means is also for causing said processor to correct for the memory conflict as part of the execution of said check instruction if said memory conflict is detected.

21. A method for checking if any memory conflicts have been detected comprising the computer implemented steps of:
    A) receiving a check instruction; and
    B) executing said check instruction by performing the steps of:
        B1) determining a first register of a plurality of registers is associated with said check instruction;
        B2) determining a memory conflict involving said first register has not been detected by polling previously recorded memory conflict information; and
        B3) leaving said memory conflict information for use in subsequent memory conflict determinations.

22. The method of claim 21, wherein said step of determining said memory conflict involving said first register has not been detected includes the steps of:
    i) determining a first field of said memory conflict information identifies said first register; and
    ii) determining a second field of said memory conflict information indicates that said memory conflict has not occurred.

23. The method of claim 22, wherein said step of leaving includes the step of not altering said second field.

24. The method of claim 21, wherein said step of leaving includes the step of not invalidating said memory conflict information.

25. A method for reordering a set of instructions, said method comprising the computer implemented steps of:
    A) determining that a load and an ambiguous store are in said set of instructions;
    B) determining that said load and said ambiguous store fall within a loop; and
    C) generating a set of reordered instructions by performing the steps of,
        C1) creating said loop in said set of reordered instructions;
        C2) placing a preload instruction above said loop that, when executed, results in the generation of a memory conflict entry representing a location from which data is or will be accessed to perform said load,
        C3) placing a store instruction inside said loop that, when executed, results in alteration or deletion of said memory conflict entry to indicate a memory conflict has occurred if said memory conflict is detected, and
        C4) placing a check instruction inside said loop that, when executed, does not alter said memory conflict entry if said memory conflict is not detected.

26. The method of claim 25, wherein said location represented by said memory conflict entry generated when said preload instruction is executed is a hashed memory address.

27. A memory conflict resolution unit for use with a processor that executes a preload instruction which specifies a storage location, and a check instruction which specifies a storage location, the memory conflict resolution unit comprising:
    a storage area configured to store a memory conflict entry in response to the preload instruction, said memory conflict entry including:
        an identification of the storage location specified by the preload instruction, and
        a validity indication specifying that the memory conflict entry is valid; and
    a circuit, coupled to the storage area, for determining whether the storage location specified by the check instruction matches the storage location specified by the preload instruction, and, responsive to a match, for altering the validity indication to specify that the memory conflict entry is invalid, said altering being performed if the check instruction is a check-invalidate instruction and not being performed if the check instruction is a check-no-invalidate instruction.

28. The memory conflict resolution unit of claim 27 wherein the processor further executes a store instruction which specifies a storage location, and wherein the circuit is responsive to the store instruction to alter the validity indication if the storage location specified by the store instruction matches the storage location specified by the preload instruction, wherein the validity indication is also a conflict indication.

29. The memory conflict resolution unit of claim 28 further comprising:
    a table including a plurality of such storage areas;
    a plurality of such circuits coupled to respective storage areas in the table; and
    means for branching execution of the processor to a recovery routine in response to a check instruction which fails to match any valid memory conflict entry in the table.

30. A computer-implemented method comprising the steps of:
    storing memory conflict information responsive to executing a preload instruction outside of a loop that contains a first check instruction, wherein said first check instruction corresponds to said first preload instruction; and
    executing said loop, wherein execution of said first check instruction leaves said memory conflict information valid if no memory conflict is detected.

31. The method of claim 30, wherein said step of executing said loop further comprises:
    executing recovery code if a memory conflict is detected responsive to executing said check instruction.

32. The method of claim 31, wherein said step of executing recovery code includes:
    storing memory conflict information responsive to executing a preload instruction inside said recovery code.

33. The method of claim 30, further comprising the step of:

invalidating said memory conflict information responsive to executing a second check instruction that corresponds to said preload instruction and that is outside of said loop.

34. A machine-readable medium having stored thereon data representing sequences of instructions, said sequences of instructions which, when executed by a computer system, cause said computer system to perform the steps of:

storing memory conflict information responsive to executing a preload instruction outside of a loop that contains a first check instruction, wherein said first check instruction corresponds to said first preload instruction; and executing said loop, wherein execution of said first check instruction leaves said memory conflict information valid if no memory conflict is detected.

35. The machine-readable medium of claim 34, wherein said step of executing said loop further comprises:

executing recovery code if a memory conflict is detected responsive to executing said check instruction.

36. The machine-readable medium of claim 35, wherein said step of executing recovery code includes:

storing memory conflict information responsive to executing a preload instruction inside said recovery code.

37. The machine-readable medium of claim 34, wherein said sequences of instructions which, when executed by the computer system, also cause said computer system to perform the step of:

invalidating said memory conflict information responsive to executing a second check instruction that corresponds to said preload instruction and that is outside of said loop.

* * * * *